United States Patent
Simms (10) Patent No.: US 10,178,203 B1
(45) Date of Patent: Jan. 8, 2019

(54) METHODS AND SYSTEMS FOR ADAPTIVELY DIRECTING CLIENT REQUESTS TO DEVICE SPECIFIC RESOURCE LOCATORS

(71) Applicant: Concurrent Computer Corporation, Duluth, GA (US)

(72) Inventor: Aaron Michael Simms, Buford, GA (US)

(73) Assignee: Vecima Networks Inc., British Columbia (CA)

( * ) Notice: Subject to any disclaimer, the term of this patent is extended or adjusted under 35 U.S.C. 154(b) by 488 days.

(21) Appl. No.: 14/494,073

(22) Filed: Sep. 23, 2014

(51) Int. Cl.
- H04L 29/06 (2006.01)
- H04L 12/24 (2006.01)
- H04N 21/266 (2011.01)
- H04N 21/61 (2011.01)

(52) U.S. Cl.
CPC .............. *H04L 67/42* (2013.01); *H04L 41/22* (2013.01); *H04N 21/266* (2013.01); *H04N 21/6175* (2013.01)

(58) Field of Classification Search
None
See application file for complete search history.

(56) References Cited

U.S. PATENT DOCUMENTS

| | | | |
|---|---|---|---|
| 5,517,588 A | 5/1996 | Kondo | |
| 7,667,770 B2 | 2/2010 | Kondo et al. | |
| 7,885,993 B2 | 2/2011 | Kondo et al. | |
| 8,352,627 B1 | 1/2013 | Mackie | |
| 8,442,377 B2 | 5/2013 | Bhogal et al. | |

(Continued)

FOREIGN PATENT DOCUMENTS

| | | |
|---|---|---|
| WO | 02/097584 | 12/2002 |
| WO | 2013050891 | 4/2013 |
| WO | 2013/100754 | 7/2013 |

OTHER PUBLICATIONS

Finamore, Alessandro et al., "Youtube everywhere: IMpact of device and infrastructure synergies on user experience", Proceedings of the 2011 ACM SIGCOMM ECE Technical Reports. Paper 418 http://docs.lib.purdue.edu/ecetr/418; Published May 20, 2011.

(Continued)

*Primary Examiner* — Philip J Chea
*Assistant Examiner* — Hassan A Khan
(74) *Attorney, Agent, or Firm* — Philip H. Burrus, IV (57) ABSTRACT

A server complex (102) includes an interface portal (116). The server complex exposes (401) a generic resource locator (402) pointing to the media content in a generic format at the interface portal. The server complex receives requests for media content (101) from at least a first client device (601) to receive the media content in a first format (603) and at least a second client device (602) to receive the media content in a second format (604). The server complex determines (405), from a header (407) of the request, whether the request is from the first client device or the second client device, generates (409) a response message (108) comprising a manifest file (109) comprising a device specific resource locator (410) pointing to the media content cached (412) in one of the first format or the second format, and transmits (411) the response message to the requesting client.

20 Claims, 8 Drawing Sheets

(56) References Cited

U.S. PATENT DOCUMENTS

| | | | |
|---|---|---|---|
| 8,443,056 B2 | 5/2013 | Hunt | |
| 8,489,760 B2 | 7/2013 | Visharam et al. | |
| 8,613,011 B2 | 12/2013 | Hicks, III et al. | |
| 2003/0018607 A1* | 1/2003 | Lennon | G06F 17/30017 |
| 2003/0018767 A1 | 1/2003 | Chatani et al. | |
| 2004/0145679 A1 | 7/2004 | Kim | |
| 2004/0193648 A1* | 9/2004 | Lai | H04N 7/17318 |
| 2005/0060382 A1 | 3/2005 | Spector et al. | |
| 2005/0131832 A1* | 6/2005 | Fransdonk | G06F 21/10 |
| | | | 705/59 |
| 2006/0005223 A1 | 1/2006 | Weng et al. | |
| 2006/0015580 A1 | 1/2006 | Gabriel et al. | |
| 2006/0047779 A1 | 3/2006 | Deshpande | |
| 2007/0024705 A1 | 2/2007 | Richter et al. | |
| 2008/0091845 A1* | 4/2008 | Mills | G06F 17/30902 |
| | | | 709/246 |
| 2010/0150531 A1 | 6/2010 | Corry et al. | |
| 2011/0082924 A1* | 4/2011 | Gopalakrishnan | H04L 65/4084 |
| | | | 709/223 |
| 2011/0258665 A1 | 10/2011 | Fahrny et al. | |
| 2012/0089700 A1* | 4/2012 | Safruti | H04L 67/2842 |
| | | | 709/217 |
| 2012/0131621 A1 | 5/2012 | Kanojia et al. | |
| 2012/0254456 A1* | 10/2012 | Visharam | H04N 21/2343 |
| | | | 709/231 |
| 2012/0265856 A1* | 10/2012 | Major | H04N 21/2225 |
| | | | 709/219 |
| 2013/0086275 A1* | 4/2013 | Melnyk | H04L 47/10 |
| | | | 709/231 |
| 2013/0091249 A1* | 4/2013 | McHugh | H04N 21/23439 |
| | | | 709/219 |
| 2013/0117685 A1 | 5/2013 | Jang | |
| 2013/0276015 A1 | 10/2013 | Rothschild et al. | |
| 2013/0291002 A1 | 10/2013 | Rothschild et al. | |
| 2014/0010286 A1 | 1/2014 | Jabri et al. | |
| 2014/0082192 A1* | 3/2014 | Wei | H04W 28/0231 |
| | | | 709/224 |
| 2014/0280781 A1* | 9/2014 | Gregotski | H04L 65/60 |
| | | | 709/219 |
| 2015/0256600 A1* | 9/2015 | Dakhane | H04L 67/10 |
| | | | 709/203 |

OTHER PUBLICATIONS

Gonzalez, J et al., "Deliverable D7.5 COAST Evaluation Report", Published Sep. 14, 2012; COAST Consortium; http://www.coast-fp7.eu/public/COAST_D7.5_TID_FF_20120914.pdf.

Havekes, A et al., "Capabilities of Current and Next-Generation Delivery Networks involved in FascinatE Services", Published Feb. 28, 2011; www.fascinate-project.eu.

Jiayi, Liu , "Multiple Live Videos Dleivery in Underprovisioned Networks", Diss. Doctorate Thesis; Published Nov. 4, 2013; Universite de Rennes.

Lehti, Lauri et al., "H2B2VS D1.1.1 Report on the state of the art technologies for hybrid distribution of TV services", Celtic-Plus, Smart Connect World. http://h2b2vs.epfl.ch/wp-content/uploads/2013/11/H2B2VS-D1-1-1-State-of-the-art-V2.pdf; Published Nov. 2013.

Ribeiro, Eduardo Filipe Freire , "A platform for the provision of Content Networks based on IMS, metadata, presence and P2P technologies", Diss. Master's thesis; Published 2008; http://iscte.pt/~rhcl/DMCN/ERMasterThesis.pdf.

* cited by examiner

METHODS AND SYSTEMS FOR ADAPTIVELY DIRECTING CLIENT REQUESTS TO DEVICE SPECIFIC RESOURCE LOCATORS

BACKGROUND

Technical Field

This disclosure relates generally to content delivery systems, and more particularly to adaptive content delivery systems.

Background Art

Content delivery systems deliver content to subscriber devices. This delivery generally occurs in real time, i.e., when the content is being received by a content delivery system, or "on demand" at a later time. Using a media content delivery system as an example, in an on-demand application a consumer can choose not only the content they wish to see, but also the viewing time as well. When a person orders a video-on-demand session, the selected content is delivered from a server to a receiving unit at the person's location, which is frequently a set-top box.

The number of devices suitable for viewing content is continually increasing. While not too long ago a set-top box was the only way to receive media content, today that content can be received on any number of devices, including computers, mobile communication devices, and so forth. Many of these devices work on different networks. For example, a smartphone may work on cellular and Wi-Fi networks, while a conventional set-top box may work on a content provider's satellite or terrestrial coaxial network. Sometimes these networks become blurred, as Wi-Fi communication at a particular location may be delivered via cellular or coaxial networks.

As the number of communications networks and communication devices is continually increasing, it is frequently necessary for a content delivery system to provide content in different formats. For example, content to be consumed on a mobile telephone might be formatted with a different resolution than would be content for consumption on a wide-screen television. This need to deliver content in different formats creates system complexity for content providers. Numerous codecs and other hardware components are required to convert content from one format to another. The conversion process results in network latency and an inferior consumer experience. It would be advantageous to have an improved content delivery system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to exposing a generic resource locator pointing to media content formatted in a generic format, receiving a request at the generic resource locator, determining a device type from a header of the request, and redirecting the requesting device to a device specific resource locator from which content may be retrieved in a desired format. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of redirecting a requesting device from a generic resource locator to a device specific resource locator where content in a predetermined format is cached as described herein. The non-processor circuits may include, but are not limited to, a network communication receiver, a network communication transmitter, signal drivers, clock circuits, power source circuits, and user input devices. As such, these functions may be interpreted as steps of a method to perform redirection from a generic resource locator to a device specific resource locator as a function of device type determined from a header of a requesting message received at the generic resource locator. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide, at a server complex, a method of redirecting content requests requesting content from a generic resource locator to a device specific resource locator with which the content, formatted as necessary for a requesting device, can be retrieved. In one embodiment, a server complex includes an interface portal to receive requests for media content from a number of client devices. In one embodiment, some client devices need content formatted in one manner, while other client devices need content formatted in another manner. For instance, a first client device may be configured to receive the media content in a first format while a second client device is configured to receive the media content in a second format. Examples of different formats include different video formats, different encoding methods, different packaging containers, different adaptive bitrates, and different resolutions. In other unique embodiments, a first format may include commercials, while a second format does not. Still other format differences will be obvious to those of ordinary skill in the art having the benefit of this disclosure.

In one embodiment, to simplify operation of the server complex, all initial incoming traffic is directed to a single resource locator. For example, in one embodiment one or more processors operating at the server complex can expose, at the interface portal, a generic resource locator pointing to media content in a generic format. The generic format may be, for example, a predefined frame size, frame rate, or encoding protocol protocols, suited for operation with a large number of devices.

In one embodiment, all initially incoming traffic is directed to the generic resource locator. For example, the one or more processors of the server complex can receive a request for media content at the generic resource locator. Embodiments of the disclosure contemplate that the device initiating the request for the media content may not be configured to receive the media content in the generic format. For example, a mobile device may not be able to consume content in the same format as a wide-screen television, as noted above. Accordingly, in one embodiment the one or more processors are configured to determine, from a header of the incoming request, what type of device is making the request. Where the incoming request is a hypertext transfer protocol (HTTP) GET request from an Apple.sup.™ smartphone for example, the one or more processors can read the "user agent" field of the HTTP GET request to determine the device type. Such a user agent field may read as follows: "Mozilla/5.0 (iPhone; CPU iPhone OS 5_0 like Mac OS X) AppleWebKit/534.46 (KHTML, like Gecko) Version/5.1 Mobile/9A334 Safari/7534.48.3." The one or more processors can read this user agent field to determine that the requesting device is an iPhone.sup.™.

Once the device type is determined, the one or more processors can generate a response message that includes a manifest file. The contents of the manifest file can be based upon the device type determination. In one embodiment, the manifest file comprises a redirect to a device specific resource locator pointing to the media content cached in a format suitable for consumption on the iPhone.sup.™, which in this case would be the Apple.sup.™ HTTP Live Streaming (HLS) format.

The one or more processors can then transmit the response message containing the manifest file to the requesting device. The response message accordingly directs the iPhone.sup.™ to a server of the server complex that has the media content cached in the Apple.sup.™ HLS format. In one embodiment, the device specific resource locator also includes an explicit reference to the formatting, e.g., the Apple.sup.™ HLS format that is required by the iPhone.sup.™. Since the content is already cached, there is no need for conversion from one format to another "on the fly." Advantageously, this reduces overall latency, simplifies server complex architecture, and improves the consumer experience.

Embodiments of the disclosure contemplate that content service providers have a need to provide the same media content in a variety of formats to suit the wide array of client devices that may be served by the system. Using adaptive bit rate encoding as an example, a first client may support Microsoft.sup.™'s HTTP Smooth Streaming (HSS) protocol, while another supports the Apple.sup.™ HSL protocol, and yet another supports the HTTP Streaming (HDS) protocol. In prior art systems, when an initial request is received, the prior art system must transcode and package the media content into the format required by the requesting client. As noted above, this results in latency and a diminished customer experience. Moreover, the prior art system must maintain a plurality of separate resource locators, one for each device, so that requesting devices can attempt to retrieve content in the proper format. Frequently, a user must select between these resource locators, which is tedious and time consuming.

By contrast, embodiments of the present disclosure provide a single, generic resource locator for all incoming media content requests. Regardless of which protocol a requesting device supports, the device requests the media content at a single, global resource locator at a client facing web portal. In one embodiment, this resource locator is a uniform resource locator (URL) that points to a generic version of the media content. In other embodiments, the generic resource locator is merely a placeholder to receive initial incoming media content requests.

In one embodiment, when a client device requests the generic resource locator, one or more processors operating in the server complex respond to the request with a device specific resource locator that provides the client device with the specific protocol manifest file required by that client device.

Figure 1:
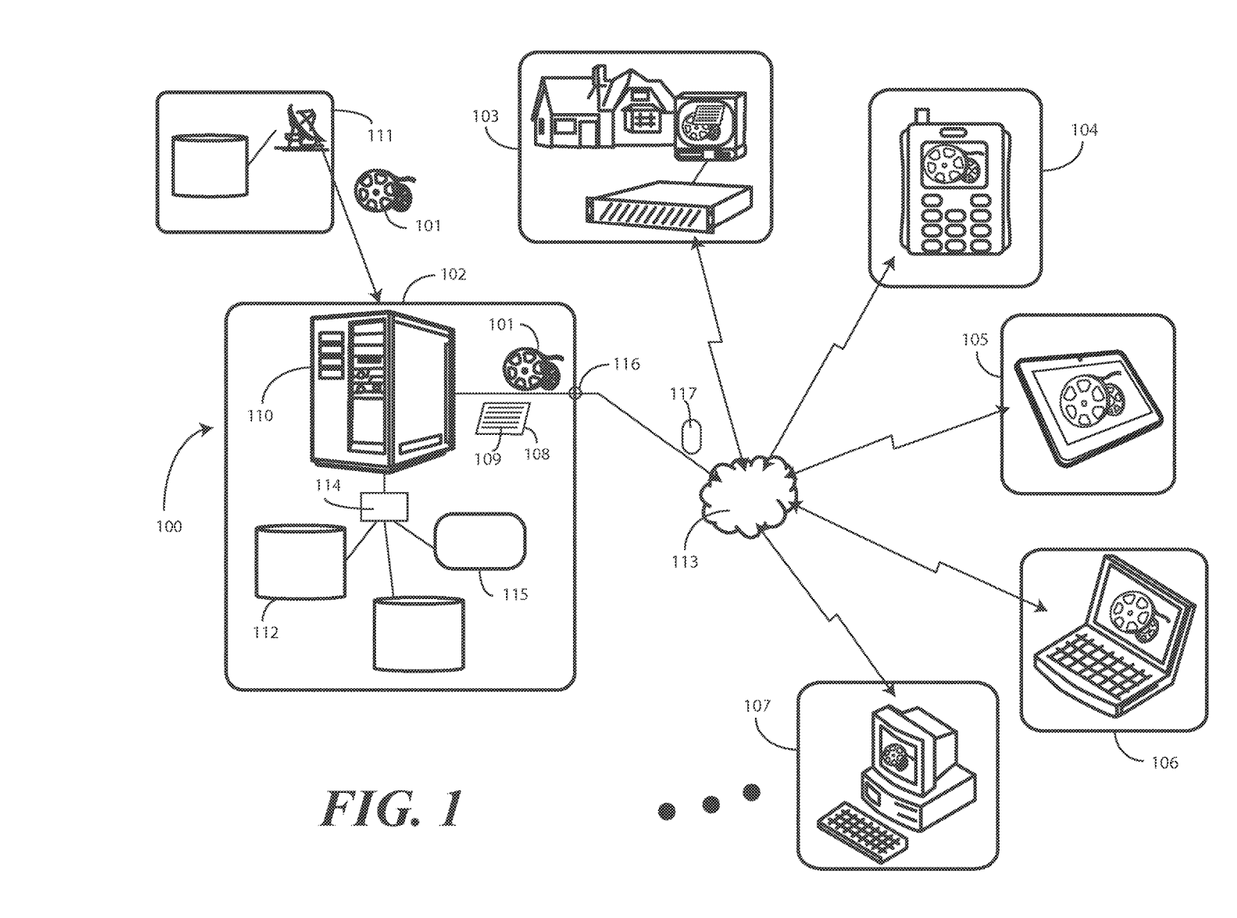
FIG. 1 illustrates one explanatory content delivery system in accordance with one or more embodiments of the disclosure.

Turning now to FIG. 1, illustrated therein is one embodiment of a system 100 configured in accordance with one or more embodiments of the disclosure. The system 100 of FIG. 1 is configured for delivering media content 101 to one or more client devices 103,104,105,106,107. FIG. 1 illustrates a macro-level view of the system 100, while more detailed structures will be described in more detail later. The system 100 of FIG. 1 is suitable for implementing the methods of providing a single, generic resource locator for initial requests for the media content 101, and then delivering response messages 108 comprising a manifest file 109 comprising a device specific resource locator pointing to the media content cached in one of the first format or the second format based upon whether the request is from a first client device to receive the media content 101 in a first format or a second client device to receive the media content 101 in a second format.

In this illustrative embodiment, each client device 103, 104,105,106,107 is a different type of device. For example, client device 103 is a set-top box coupled to a monitor or television at a person's home. Client device 104 is a smartphone. Client device 105 is a tablet computer. Client device 106 is a laptop computer. Client device 107 is a desktop computer. These types of devices are illustrative only, as others will be obvious to those of ordinary skill in the art having the benefit of this disclosure.

A server complex 102 is in communication with the client devices 103,104,105,106,107. In one embodiment, the server complex 102 includes an interface portal 116. The interface portal 116 is configured to receive requests 117 for media content 101. The requests 117 can come from any of the client devices 103,104,105,106,107. The server complex 102 can include one or more servers. In FIG. 1, the server complex is shown has having only a central server 110 for brevity. However, one or more intermediate servers can be disposed between the central server 110 and the client devices 103,104,105,106,107 as is shown in FIG. 3.

Figure 3:
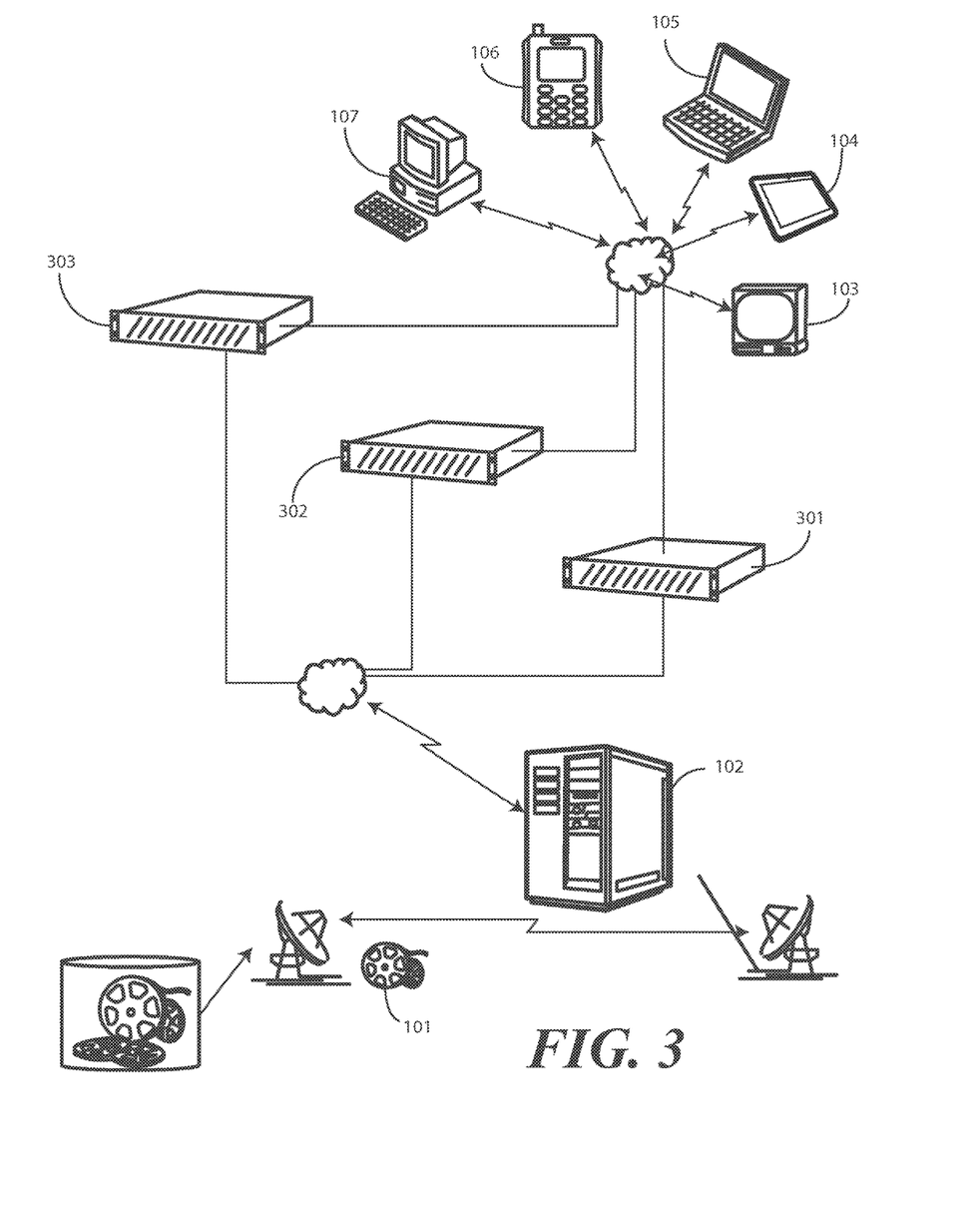
FIG. 3 illustrates another explanatory content delivery system in accordance with one or more embodiments of the disclosure.

Turning briefly to FIG. 3, the server complex 102 can optionally be operable with one or more edge servers 301,302,303. Accordingly, the server complex 102 can arrange the storage of media content 101 on one or more of the edge servers 301,302,303 for rapid delivery to the client devices 103,104,105,106,107 by replicating the media content 101 on a memory device of one or more of the edge servers 301,302,303.

In one or more embodiments, each edge server 301,302, 303 is capable of storing quantities of data, including but not limited to media content and other types of content. In one embodiment, each edge server 301,302,303 is operable with a streaming engine to deliver streaming content in the form of video and audio upon the request of a client device.

Turning now back to FIG. 1, in one embodiment, the server complex 102 can receive the media content 101 from a content provider 111. For example, a content receiver (not shown) operable with the server complex 102 can receive the media content 101 from the content provider 111. The media content 101 can comprise any type of data, metadata, or other content. The content provider 111 can provide the media content 101 in various formats. For example, the server complex 102 may receive radio-frequency signals by satellite or data packets by land-based communication networks. The server complex 102 may also receive data from asynchronous transfer mode (ATM) networks, local feeds, or other sources. In one embodiment, the media content 101 can be delivered in accordance with a real time streaming protocol format. The media content 101 can also be delivered in accordance with one or more adaptive bitrate streaming protocol standards.

In one embodiment, the server complex 102 then stores the media content 101 in a content database 112. The server complex 102 can optionally be configured to insert the advertisements into the media content 101. Where necessary, the server complex 102 can optionally process and/or reformat the media content 101 as necessary for delivery to the client devices 103,104,105,106,107. For example, media content 101 may be received in digitally compressed format, demultiplexed by a demultiplexer, and stored in any convenient format or formats, such as MPEG-1, MPEG-2, MPEG-3, or MPEG-4. It will be clear to those of ordinary skill in the art having the benefit of this disclosure that other formats can be used as well. Such formats are known in the art and will not be discussed in further detail here in the interest of brevity.

Figure 2:
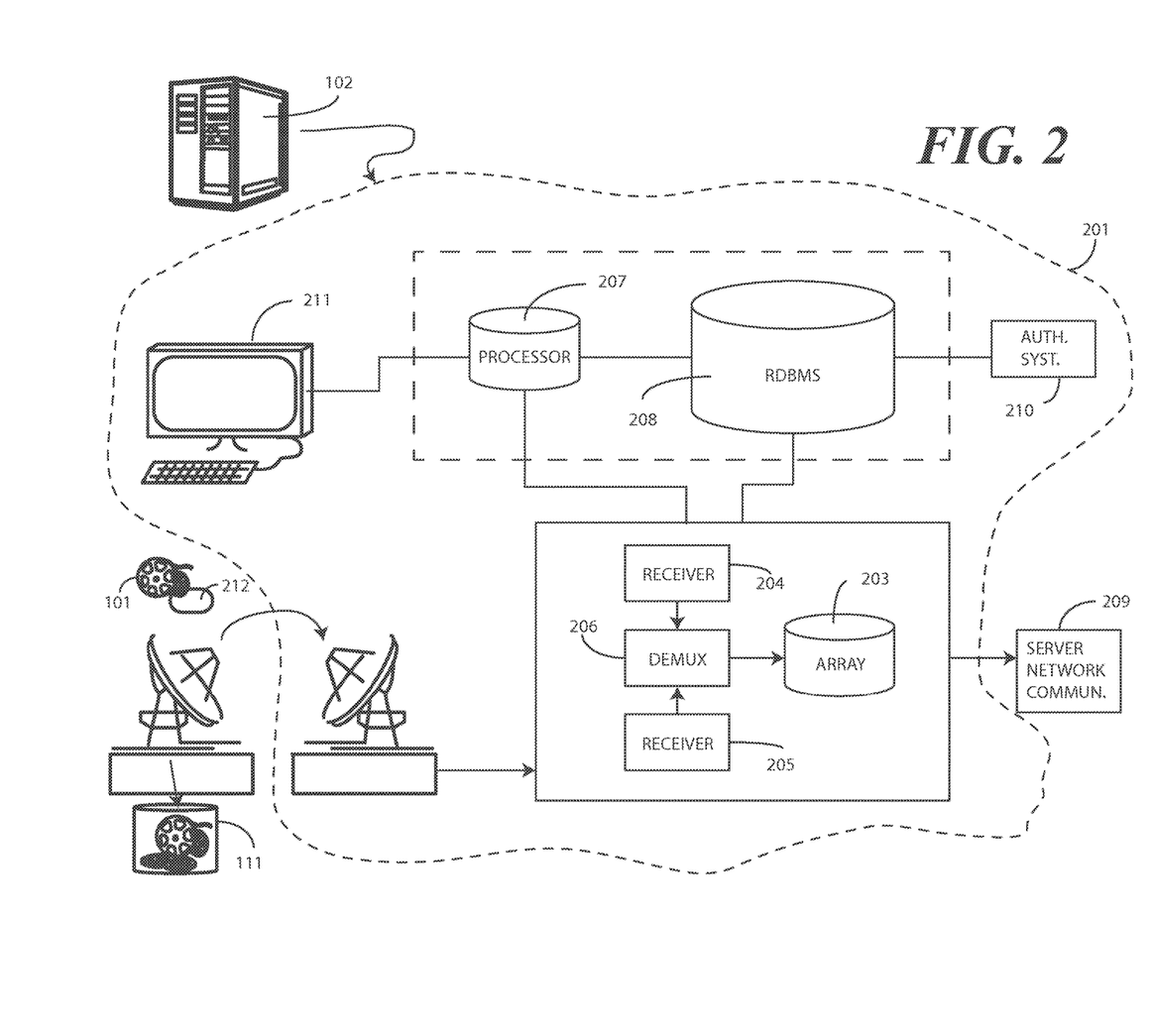
FIG. 2 illustrates one explanatory server complex suitable for use in a content delivery system in accordance with one or more embodiments of the disclosure.

Turning briefly to FIG. 2, illustrated therein is one explanatory sever complex 102 configured in accordance with one or more embodiments of the disclosure. A schematic block diagram 201 illustrates various components of the server complex 102, showing only those specific details that are pertinent to understanding the embodiments of the present disclosure so as not to obscure the disclosure with details that will be readily apparent to those of ordinary skill in the art having the benefit of the description herein. Accordingly, those of ordinary skill in the art having the benefit of this disclosure will recognize that other components may be included in a server complex 102 as well.

As noted above, in one embodiment the server complex 102 retrieves media content 101 from a content provider 111. In one or more embodiments, at least some segments and/or content offerings are encoded at a different bitrate, resolution, or combination thereof in accordance with a selected adaptive bitrate-encoding standard. Where this is the case, the server complex 102 can also retrieve, from the content provider 111, a manifest file 212 identifying the encoding standard.

Regardless of how the media content 101 is received, in one or more embodiments, the server complex 102 stores the media content 101 in a content storage device, such as a disk array 203. Disk array 203 may be a JBOD (just a bunch of disks) or RAID (redundant array of inexpensive disks) with various architectures and interfaces, such as FC-AL (Fiber Channel-Arbitrated Loop) or SSA (Serial Storage Architecture). The components of the server complex 102 may also include one or more communication devices, such as receivers 204,205 for receiving the media content 101. The receivers 204,204 can include DHEI (DigiCable Headend Expansion Interface) receivers or ATM (Asynchronous Transfer Mode) receivers. Demodulating and demultiplexing circuitry 206 may also be included. The server complex 102 can also include communication devices 209 that function as the interface portal (117). For example, the communication devices 209 can receive requests (117) for the media content 101. Additionally, the communication devices 209 can deliver the media content 101 to the various client devices (103,104,105,106,107) in response to receiving the requests (117) for the media content 101.

In one or more embodiments the server complex 102 includes one or more processors 207 and, optionally, a relational database management system 208. The relational database management system 208 can function, in one or more embodiments, as a server or storage device. The storage devices of the relational database management system 208 can contain a listing or table of one or more of the following: the content providers, the content offerings, manifest files, etc., the servers upon which the content is stored, and so forth. In one or more embodiments, the server complex 102 includes a computer terminal 211 with which an operator can control the operation of the one or more processors 207.

In one or more embodiments, the server complex 102 is coupled with an authorization system 210. The optional authorization system 210 can store information on the features, privileges, benefits, bonuses, space, tiers, etc., available to each content management system and/or to each content provider. The authorization system 210 may be external to the server complex 102 or may be included within the server complex 102, such as part of the relational database management system 208. Thus, when a particular client device (103,104,105,106,107) requests the media content 101, the server complex 102 may interrogate the authorization system 210 to determine whether or not the client device (103,104,105,106,107) is authorized to receive the media content 101. If not, then the request may be denied.

Turning now back to FIG. 1, each client device 103,104, 105,106,107 is configured to receive and present media content. However, these client devices 103,104,105,106,107 may not be able to consume content in a single format. For example, a first client device can be configured to receive the media content 101 in a first format, while a second client device is configured to receive the media content 101 in a second format. Embodiments of the disclosure contemplate that, in a multi-client content delivery network such as system 100 of FIG. 1, an operator needs to provide a given content offering in different formats to suit the particular needs of each client device 103,104,105,106,107.

Illustrating by example, one user may request a content offering 101, e.g., a television show, formatted for a set-top box (client device 103). Meanwhile, another requests the same show for a tablet computer (client device 105). In one embodiment, each of these client devices 103,105 functions as an adaptive bit-rate video player supporting a particular adaptive bit-rate format, such as those defined by the MSS, HLS, HDS, or other protocols. Embodiments of the disclosure contemplate that it is uncommon for a particular client device to support multiple formats. Accordingly, a content delivery network operator may be required to transcode and package each media content offering in several different formats corresponding to the different client devices the network supports.

Embodiments of the disclosure do this in a seamless and non-latent manner. In one embodiment, one or more processors of the server complex 102 function to present a single, generic, "device independent" URL for each offering of media content 101. The single URL can be provided at a client-facing web portal 114 of the server complex 102. In one embodiment, this single URL points to either a "generic version" of the content offering, i.e., not encoded specifically to operate on only one type of device, or alternatively to a placeholder for the generic media content 101. When a client device 103,104,105,106,107 calls the device independent URL, a request router 115 at the web portal 114 determines the client device type by reading a header of the content request. For example, where the request is an HTTP GET command, the request router 115 can read the user agent field found in the HTTP GET request that is received in the client's request for the media content 101. In one embodiment, the request router 115 is pre-programmed with a mapping of common user agent types and their corresponding video formats.

From this determination, the server complex 102 can generate a response message 108 comprising a manifest file 109 comprising a device specific resource locator pointing to the media content 101 cached in either the server complex 102 or an edge server (301,302,303). In one embodiment, the cached media content 101 to which the device specific resource locator points is in one of the first format or the second format, with the format selection based upon whether the request is from the first client device or the second client device. The server complex 102 can then transmit the response message 108 in response to receiving the request for the media content 101 to the requesting device. This process is shown in more detail in FIG. 3.

Turning now to FIG. 3, the server complex 102 and the various client devices 103,104,105,106,107 are shown in a communication flow chart 400. The server complex 102 can initially expose, at an interface portal 116 of the server complex 102 or an edge server 302, a generic resource locator 402. In one embodiment, the generic resource locator 402 is a URL. In one embodiment, the generic resource locator 402 points to media content 101 in a generic format. For example, if the media content 101 is received from a content provider (111) as a MPEG-4 file, the generic resource locator 402 may point to the media content 101 as a single, MPEG-4 file. This is referred to as "generic" content because it can be played on a number of multimedia rendering devices. In another embodiment, the generic resource locator 402 points to a placeholder for the media content 101.

In one embodiment, a user selects the media content 101 by way of a client device 105. The client device 105 then sends a request 403 for the media content 101 to the server complex 102. In one embodiment, the request 403 points to the generic resource locator 402. In one embodiment, the request 403 comprises a HTTP GET request. The server complex 102 receives 404 the request 403 for the media content 101 at the generic resource locator 402.

In one embodiment, the server complex 102 then determines 405, from a header 407 of the request 403, the identity 406 of the requesting device. Where the request 403 is a HTTP GET request, the header 407 can comprise the user agent field of the HTTP GET request. For example, the server complex 102 can determine whether the request 403 is from a first client device, e.g., client device 105, or a second client device, e.g., client device 106, by reading the user agent field of a HTTP GET request in one or more embodiments.

In one embodiment, the server complex 102 then selects 408 a server on which the media content 101 is cached in a format required by the requesting device. This selection can be based upon whether the request 403 comes from a first client device 105 or a second client device 106. In this example, the requesting device is an Apple.sup.™ iPad-.sup.™. The server complex 102 references a lookup table to determine that an Apple.sup.™ iPad.sup.™ requires the media content 101 encoded with the HSL protocol. As the media content 101 is cached in this format on edge server 303, the server complex 102 selects 408 edge server 303 based upon determining that the requesting device is an Apple.sup.™ iPad.sup.™ from reading the user agent field of the HTTP GET request.

The server complex 102 then generates 409 a response message 108. In one embodiment, the response message 108 comprises an HTTP REDIRECT message 417. In one embodiment, the response message 108 comprises a manifest file (109). For example, if the format required by the requesting device is in accordance with an adaptive bitrate coding protocol, the manifest file (109) can comprise an adaptive bit rate manifest file.

In one embodiment, the manifest file (109) comprises a device specific resource locator 401 pointing to the media content 101 cached 412 at the edge server 303 in the format required by the requesting device, which is the HLS format in this example. In one embodiment, the device specific resource locator 401 is a URL. In one embodiment, the response message 108 is configured in the format required by the requesting device. This configuration can be in response to determining which client device 103,104,105, 106,107 is the requesting device. The server complex 102 then transmits 411 the response message 108 to the requesting device in response to receiving the request 403 for the media content 101.

The server complex 102 also exposes 413 the device specific resource locator 410 at the interface portal 116. Note that the media content 101 configured in the format required by the requesting device could have been stored at a central server (110) of the server complex 102, or at one or more intermediate servers such as edge servers 301,302,303. In this example, the media content 101 is cached 412 at edge server 303 in the format required by the requesting device. Accordingly, in this example the server complex 102 comprises a first server, e.g., central server (110) and a second server, e.g., edge server 303. The server complex 102 accordingly exposes 413 the device specific resource locator 410 at the second server despite having exposed 401 the generic resource locator 402 at the first server. As noted above, the use of an edge server 303 that is disposed closer to the client devices 103,104,105,106,107 advantageously reduce latency in one or more applications.

Upon receiving the response message 108, the client device 105 then sends a second request 414 for the media content 101. In one embodiment, the second request 414 is another HTTP GET request that includes the device specific resource locator 410. The server complex 102, at edge server 303 in this example, receives 415 the second request 414 at the device specific resource locator 410.

The server complex 102, via the edge server 303 in this example, then delivers 416 the media content 101 in the format required by client device 105. The media content 101 can be sent across the interactive network (113) by way of network equipment that provides the managing, processing, and modulation, as appropriate, for the delivery of the content offering across the interactive network (113) to the client device 105. The interactive network (113) may be any type of network capable of transferring data electronically, such as, but not limited to, cable networks, the Internet, wireless networks, Telco networks, or satellite networks. Other networks will be obvious to those of ordinary skill in the art having the benefit of this disclosure.

Figure 4:
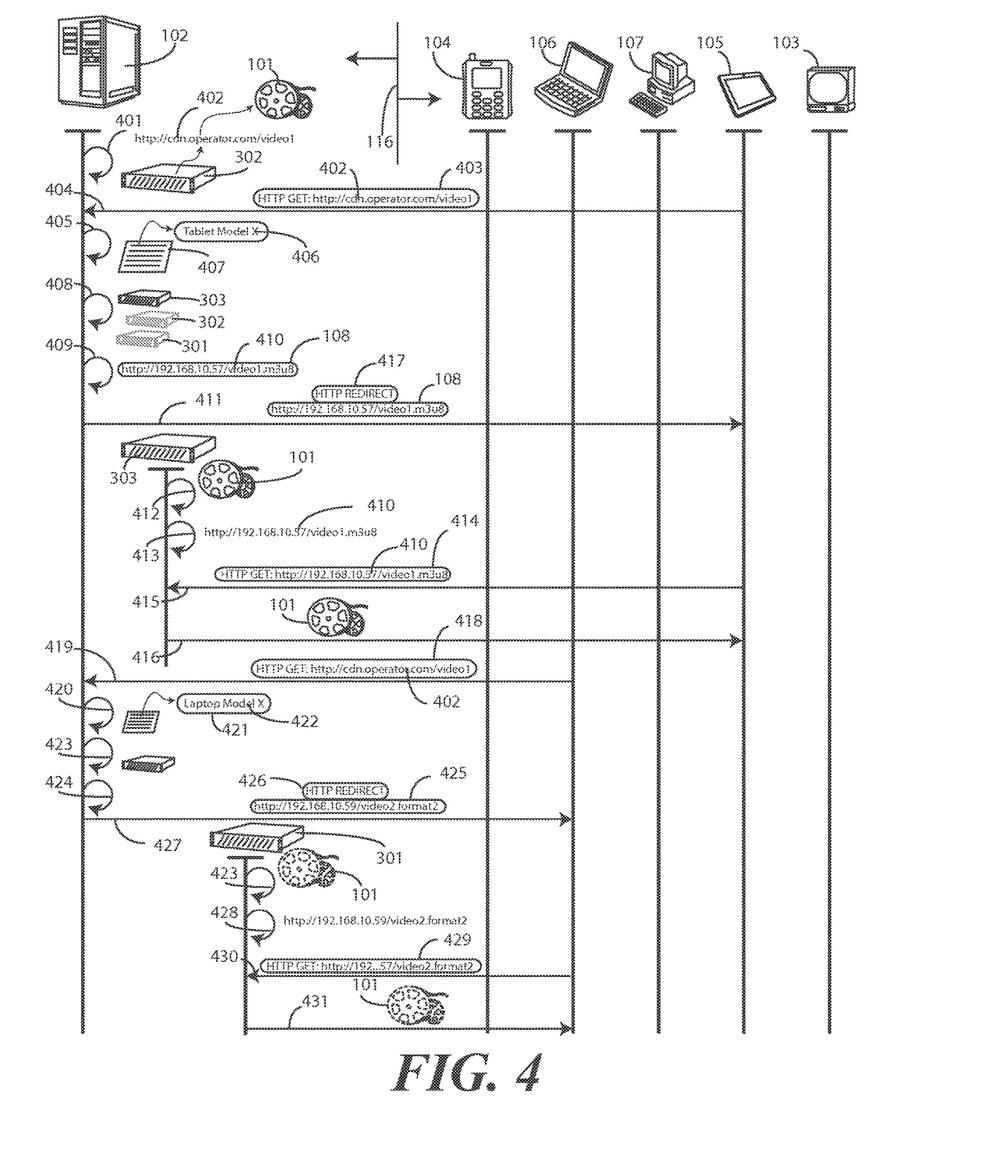
FIG. 4 illustrates one explanatory system in accordance with one or more embodiments of the disclosure.

Now suppose a second client device, i.e., client device 106, also requests the media content. However, while client device 107 is to receive media content 101 in a first format, client device 106 is to receive content in a second format such as HSS. The method shown in FIG. 4 repeats. However, since the second format is different from the first format, the device specific resource locator will change.

Specifically, when a user selects the media content 101 by with client device 106, the device sends a second request 418 for the media content 101 to the server complex 102. As with the request 403 from client device 105, in one embodiment the request 418 from client device 106 points to the generic resource locator 402. The server complex 102 receives 419 the request 418 for the media content 101 at the generic resource locator 402. As before, the request 418 can be an HTTP GET request.

The server complex 102 then determines 420, from a user agent field 421 of the HTTP GET request, the identity 422 of the requesting device. In one embodiment, the server complex 102 then selects 422 a server on which the media content 101 is cached 423 in the format required by the requesting device. Since client device 106 is a different type of device than client device 105, the required format will be a second format that is different from the format that was stored on edge server 303. As media content 101 in this second format is cached 423 at edge server 301, the server complex 102 selects 422 edge server 301 based upon determining the identity 422 of client device 106 from the user agent field 421 of the HTTP GET request.

The server complex 102 then generates 424 a response message 425. In one embodiment, the response message 424 comprises a manifest file comprising a device specific resource locator 426 pointing to the media content 101 cached 423 at the edge server 301 in the second format. The server complex 102 then transmits 427 the response message 425 to the requesting device.

The server complex 102 exposes 428 the device specific resource locator 426 at the interface portal 116. Upon receiving the response message 425, the client device 106 then sends a second request 429 for the media content 101. The server complex 102, at edge server 301 in this example, receives 430 the second request 429 at the device specific resource locator 426. The server complex 102, via the edge server 301 in this example, then delivers 431 the media content 101 in the format required by client device 106.

Figure 5:
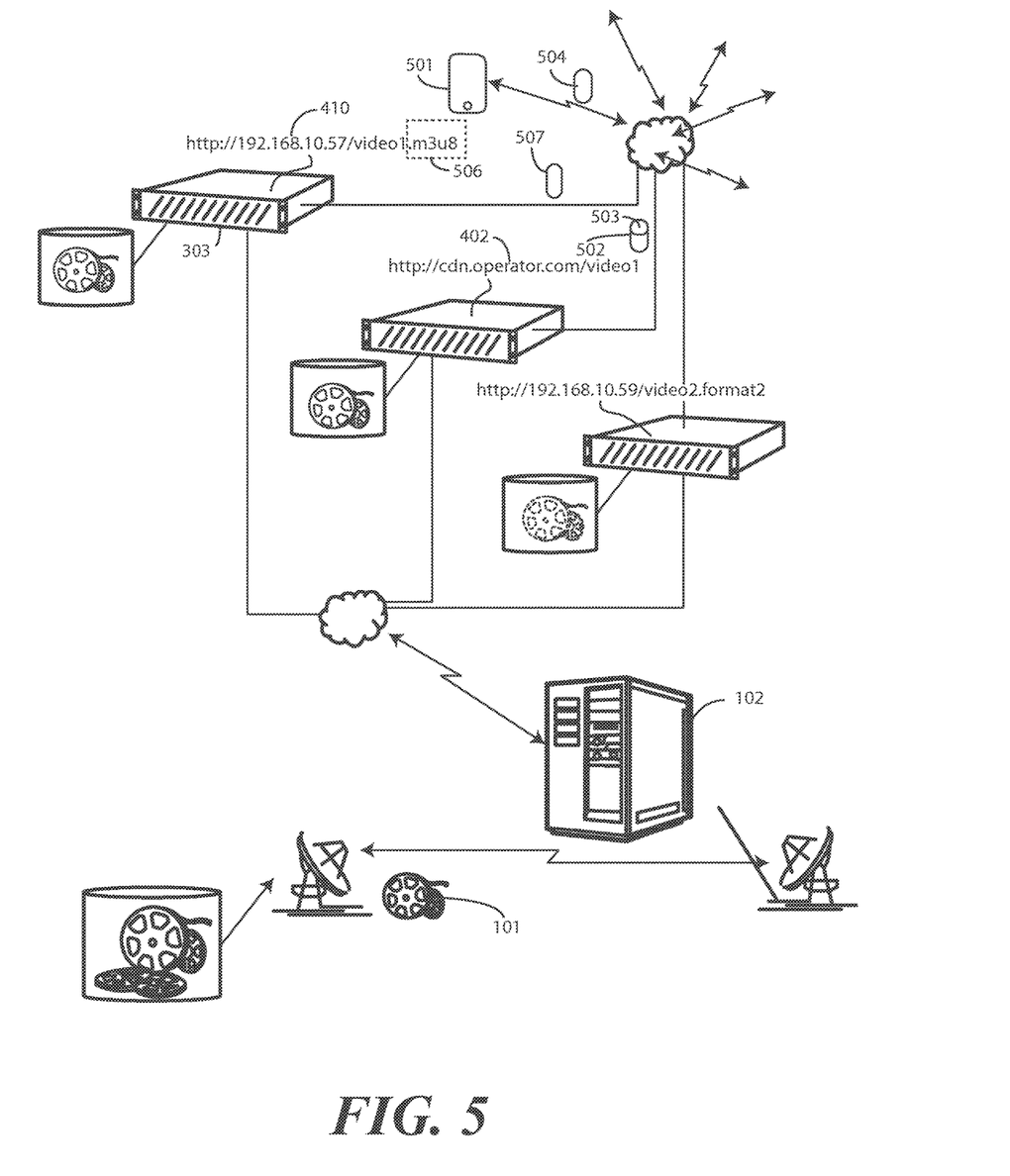
FIG. 5 illustrates another explanatory content delivery system in accordance with one or more embodiments of the disclosure.

A device specific example will now be used to assist in illustrating the operation of one embodiment of the disclosure. Turning now to FIG. 5, presume a client device 501 is an Apple.sup.™ iPhone.sup.™. The client device 501 sends an HTTP GET request 502 to the server complex 102. The initial HTTP GET request 502 includes a reference to the generic resource locator 402. Additionally, the HTTP GET request 502 includes a user agent field 503 that reads as follows: Mozilla/5.0 (iPhone; CPU iPhone OS 5_0 like Mac OS X) AppleWebKit/534.46 (KHTML, like Gecko) Version/5.1 Mobile/9A334 Safari/7534.48.3.

The request router (115) of the web portal (114) of the server complex 102 determines that the client device 501 is an iPhone.sup.™ running the iOS.sup.™ 5.0 operating system. By referencing a look-up table, the request router (115) determines that this particular client device 501 requires media content 101 in the Apple.sup.™ HLS format.

The request router (115), in response to this HTTP GET request 502, delivers an HTTP redirect 504 to the client device 501 with a new URL, namely a device specific resource locator 410 pointing to an edge server 303 that will deliver the media content 505 in the Apple.sup.™ HLS format. In one embodiment, this new URL also includes an explicit reference 506 to the Apple.sup.™ HLS format of the media content 505 that the iPhone.sup.™ is capable of rendering.

Accordingly, in accordance with one or more embodiments of the disclosure, a server complex 102 publishes just a single URL, i.e., generic resource locator 402, on the web portal (114) for a given offering of media content 101. In one embodiment this URL is agnostic with reference to the video format. In one embodiment, the URL simply references a generic location at the server complex where the media content 101 is cached as a non-format-specific file.

The request router (115) receives the HTTP GET requests referencing this generic URL. The request router (115) can then respond to the client device with the specific manifest required by the client device 105 that will point to the media content 505 cached in the proper format.

As described, based on the user agent field 503 found in the header of the HTTP GET request 502, the request router (115) can then determine the client device type that is making the request. The request router (115) can then create a manifest file in the appropriate format for the client device 501. The request router (115) can then respond to the client's HTTP GET request 502 with an appropriate manifest file.

In one embodiment, as part of the manifest file that is returned to the client device 501, the request router (115) will write the device specific resource locator 410 within the manifest to point to an edge server 303 that the request router (115) has chosen to service the client's request. Thus, the client device 501, upon receiving the manifest from the request router (115), will perform another HTTP GET request 507 to the device specific resource locator 410 indicated in the manifest to retrieve the media content 505 in the proper format from the edge server 303.

In one embodiment, the edge server 303, upon receiving the HTTP GET request 507, will determine if the media content 505 in the required format is already in cache. If it is in cache, then it will serve it to the client device 501. If it is not in cache, then it will retrieve the media content 505 from the server complex 102. The server complex 102 may transcode the media content 505 from one format into another in order to provide the edge server 303 with the requested format. Note, however, that in one embodiment when this occurs the client device 501 has already been provided the required manifest and device specific resource locator 410 by the request router (115). This occurs by way of logic contained within the request router (115) and not by any web scripting or client decision in one or more embodiments.

The process outlined above can be used with other clients and/or device types. The general flow of the method is as follows: The operator or content provider has a web portal of media content. Each piece of media content is published on the portal with a generic URL, e.g. http://cdn.operator.com/video1.

The user selects media content. Their client device sends an HTTP GET request for http://cdn.operator.com/video1. A domain name system (DNS) at the server complex resolves cdn.operator.com to the IP address of the request router. As a result of this DNS resolution, the request router receives the HTTP GET request from the client for http://cdn.operator.com/video1.

The request router looks at the user agent field in the HTTP headers and determines the client device type. The request router then consults its internal mappings of client devices to media content formats. For example, the request router determines that an iPhone.sup.™ is making the request, it will also determine that it therefore needs an Apple.sup.™ HLS video format. The request router can also select an appropriate edge server that can service the request. In one embodiment this decision is based on the video format requested and/or the client's geographical proximity to the edge servers.

The request router then constructs or identifies a new device specific resource locator and sends an HTTP 302 redirect back to the client device. This redirect can include this device specific URL. The device specific URL can include an explicit reference to the edge server chosen to service the request, as well as an explicit reference to the video format required by the client device, e.g. http://192.168.10.57/video1.m3u8.

The client device receives this HTTP redirect and then sends another HTTP GET request, using the new URL. For example, the client device sends HTTP GET http://192.168.10.57/video1.m3u8. The edge server, i.e. 192.168.10.57, receives the HTTP GET request. If the edge server has the content in cache, it serves it to the client. If the edge server does not have the content in cache, the edge server sends an HTTP GET request to another server of the server complex to retrieve the content in the proper format. The edge server then serves the content in the proper format to the client device.

It should be noted that the formats required by client devices can vary. Turning now to FIGS. 6-10, illustrated therein are a few examples of different formats for different client devices. Others will be obvious to those of ordinary skill in the art having the benefit of this disclosure. It should be noted that the formats illustrated in FIGS. 6-10 could be used alone or in combination.

Figure 6:
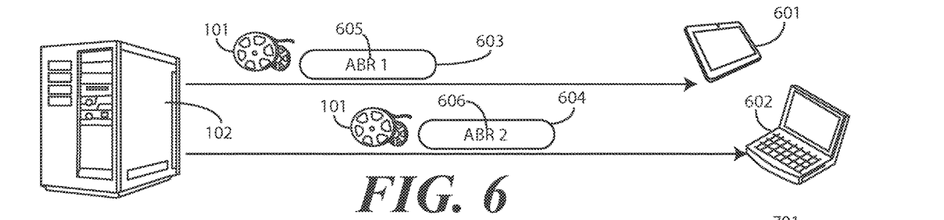
FIG. 6 illustrates another explanatory system in accordance with one or more embodiments of the disclosure.

Beginning with FIG. 6, a first client device 601 is to receive media content 101 in a first format 603. Similarly, a second client device 602 is to receive the media content 101 in a second format 604. The first format 603 is different from the second format 604. Using the methods and systems described above, a server complex 102 delivers the media content 101 to the first client device 601 in the first format 603, while delivering the media content 101 to the second client device 602 in the second format 604. In this illustrative embodiment, the first format 603 is a first adaptive bitrate coding protocol 605. The second format 604 is a second adaptive bitrate coding protocol 606.

Figure 7:
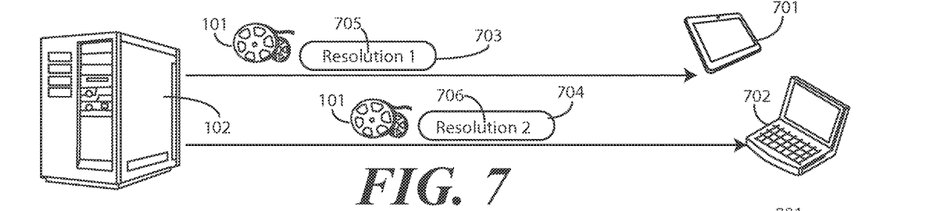
FIG. 7 illustrates another explanatory system in accordance with one or more embodiments of the disclosure.

Turning now to FIG. 7, a first client device 701 is to receive media content 101 in a first format 703. Similarly, a second client device 702 is to receive the media content 101 in a second format 704. The first format 703 is different from the second format 704. Using the methods and systems described above, a server complex 102 delivers the media content 101 to the first client device 701 in the first format 703, while delivering the media content 101 to the second client device 702 in the second format 704. In this illustrative embodiment, the first format 703 is a first content resolution 705. The second format 704 is a second content resolution 706.

Figure 8:
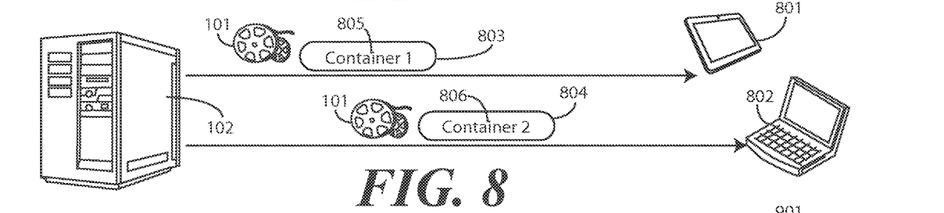
FIG. 8 illustrates another explanatory system in accordance with one or more embodiments of the disclosure.

Turning now to FIG. 8, a first client device 801 is to receive media content 101 in a first format 803. Similarly, a second client device 802 is to receive the media content 101 in a second format 804. The first format 803 is different from the second format 804. Using the methods and systems described above, a server complex 102 delivers the media content 101 to the first client device 801 in the first format 803, while delivering the media content 101 to the second client device 802 in the second format 804. In this illustrative embodiment, the first format 803 is a first packet container configuration 805. The second format 804 is a second packet container configuration 806.

Figure 9:
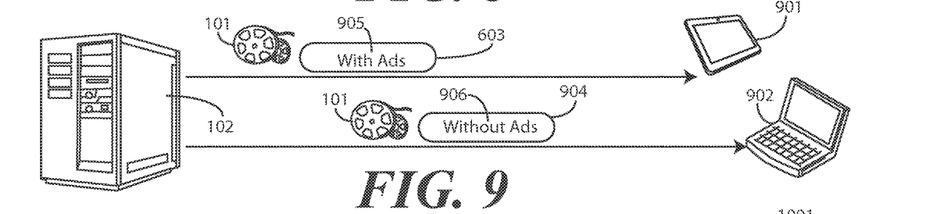
FIG. 9 illustrates another explanatory system in accordance with one or more embodiments of the disclosure.

Turning now to FIG. 9, a first client device 901 is to receive media content 101 in a first format 903. Similarly, a second client device 902 is to receive the media content 101 in a second format 904. The first format 903 is different from the second format 904. Using the methods and systems described above, a server complex 102 delivers the media content 101 to the first client device 901 in the first format 903, while delivering the media content 101 to the second client device 902 in the second format 904. In this illustrative embodiment, the first format 903 is the media content 101 with advertisements inserted therein 905. The second format 704 is the media content 101 without advertisements 906. Advantageously, embodiments of the disclosure allow a content provider to structure the format differences in accordance with different levels of service. For example, client device 901 may pay a lower subscription rate than client device 902, and thus may be required to receive the media content 101 with advertisements inserted therein 705.

Figure 10:
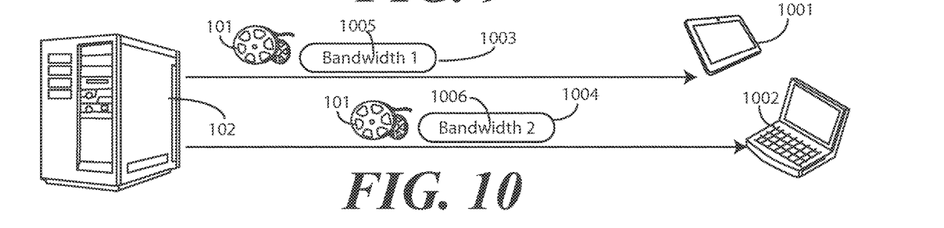
FIG. 10 illustrates another explanatory system in accordance with one or more embodiments of the disclosure.

Turning now to FIG. 10, a first client device 1001 is to receive media content 101 in a first format 1003. Similarly, a second client device 1002 is to receive the media content 101 in a second format 1004. The first format 1003 is different from the second format 1004. Using the methods and systems described above, a server complex 102 delivers the media content 101 to the first client device 1001 in the first format 1003, while delivering the media content 101 to the second client device 1002 in the second format 1004. In this illustrative embodiment, the first format 1003 is a first streaming bandwidth 1005. The second format 1004 is a second streaming bandwidth 1006. Advantageously, embodiments of the disclosure allow a content provider to structure the format differences in accordance with different levels of service. For example, client device 1001 may pay a lower subscription rate than client device 1002, and thus may be required to receive the media content 101 streamed at a lower bandwidth than client device 1002. Each of these levels of service can be altered by the simple reconfiguration of a manifest file in a response message as noted above.

Figure 11:
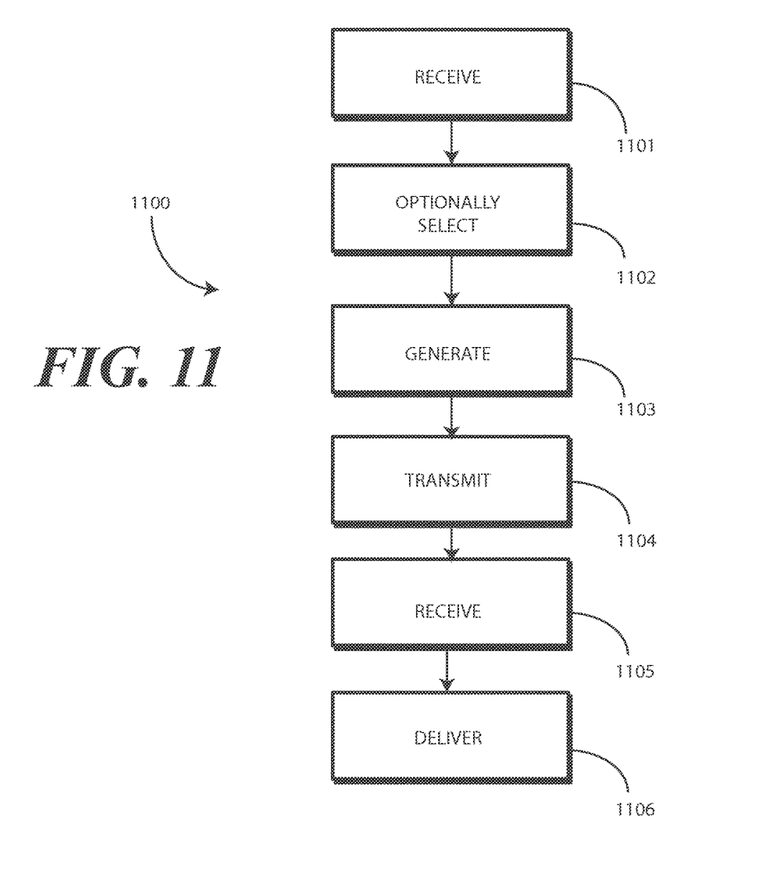
FIG. 11 illustrates an explanatory method in accordance with one or more embodiments of the disclosure.

Turning now to FIG. 11, illustrated therein is one explanatory method 1100 in accordance with one or more embodiments of the disclosure. At step 1101, the method 1100 receives, at an interface portal of a server complex, a request for media content at a generic resource locator. In one embodiment, the request is from one of a first client device to receive the media content in a first format or a second client device to receive the media content in a second format.

At step 1102, the method determines, from a header of the request, with one or more processors of the server complex, whether the request is from the first client device or the second client device. In one embodiment, step 1102 optionally includes selecting a server upon which content in a predefined format is cached as a function of whether the request is from the first client device or the second client device.

At step 1103, the method 1100 generates, with the one or more processors, a response message comprising a manifest file. In one embodiment, the manifest file defines a device specific resource locator pointing to the media content cached in one of the first format or the second format based upon whether the request is from the first client device or the second client device. At step 1104, the method 1100 transmits, with a communication device of the server complex, the response message in response to receiving the request for the media content to the one of the first client device or the second client device.

At step 1105, the method 1100 receives a second request for the media content at the device specific resource locator. In one embodiment, the receiving of step 1101 occurs at a first server of the server complex, while the receiving of step 1105 occurs at a second server of the server complex. In other embodiments, the receiving of step 1101 occurs at the same server as the receiving of step 1105. At step 1106, the method delivers the media content in the one of the first format or the second format. In one embodiment, step 1106 occurs in response to the receiving the second request at step 1105.

Figure 12:
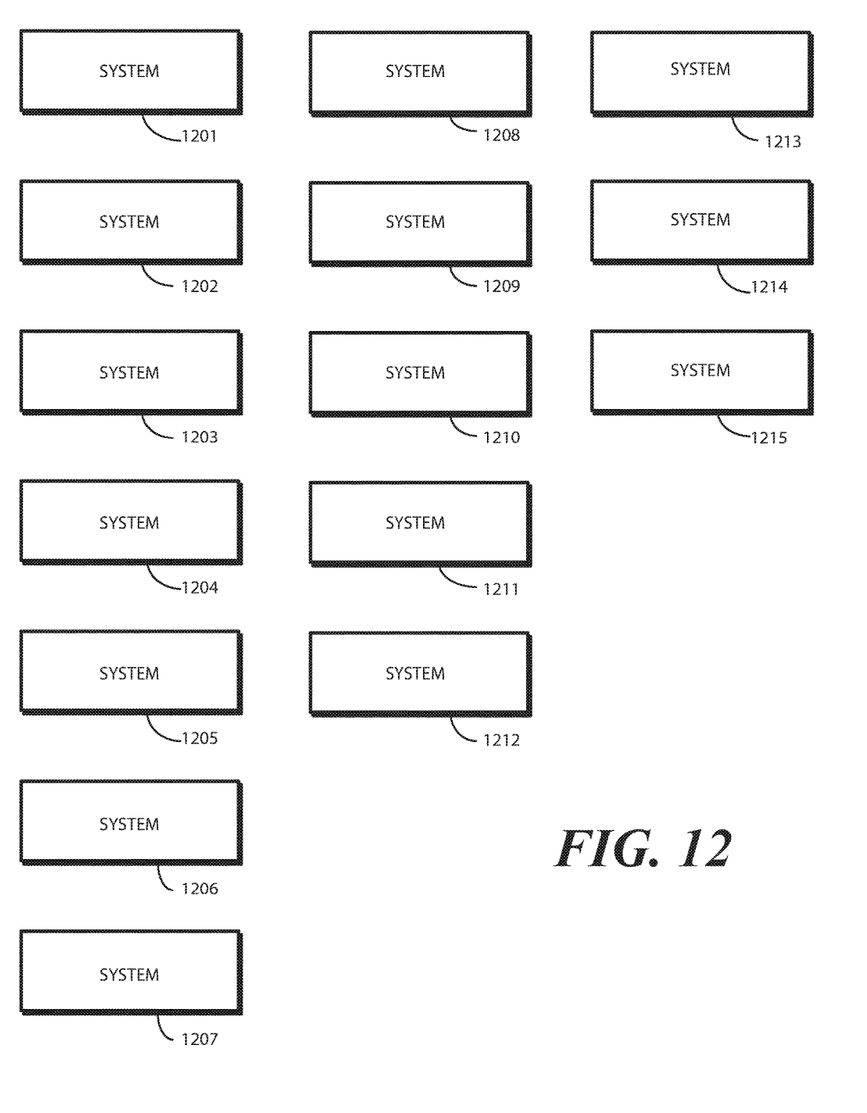
FIG. 12 illustrates various embodiments of the disclosure.

Turning now to FIG. 12, illustrated therein are various embodiments of the disclosure. At 1201, a system comprises a server complex. At 1201, the server complex comprises an interface portal. At 1201, the interface portal is to receive requests for media content from at least a first client device to receive the media content in a first format and at least a second client device to receive the media content in a second format.

At 1201, the server complex includes one or more processors that are operable with the interface portal. At 1201, the one or more processors are to expose, at the interface portal, a generic resource locator pointing to the media content in a generic format. At 1201, the one or more processors are to receive a request for the media content at the generic resource locator. At 1201, the one or more processors are to determine, from a header of the request, whether the request is from the first client device or the second client device.

At 1201, the one or more processors are to generate a response message. At 1201, the response message can comprise a manifest file. At 1201, the manifest file can comprise a device specific resource locator pointing to the media content cached in one of the first format or the second format based upon whether the request is from the first client device or the second client device. At 1201, the one or more processors can transmit the response message in response to receiving the request for the media content.

At 1202, the one or more processors can expose, at the interface portal, the device specific resource locator. At 1203, the response message of 1201 can be configured in the one of the first format or the second format based upon whether the request of 1201 is from the first client device or the second client device.

At 1204, the server complex of 1201 comprises at least a first server and a second server. At 1204, the one or more processors are to expose the generic resource locator at the first server and to expose the device specific resource locator at the second server. At 1205, the first server of 1204 is disposed farther from the first client device or the second client device than the second server. At 1206, the one or more processors are further to select the second server of 1204 based upon whether the request is from the first client device or the second client device.

At 1207, the one or more processors of 1201 are to receive a second request for the media content at the device specific resource locator. At 1208, the one or more processors of 1201 are to deliver the media content in the one of the first format or the second format based upon whether the device specific resource locator points to the media content in the first format or the second format. At 1208, the request at the generic resource locator of 1207 is from the second client device and the device specific resource locator pointing to the media content cached in the second format.

At 1209, the request of 1201 comprises a hypertext transfer protocol (HTTP) GET request. At 1210, the response message of 1201 comprises a HTTP redirect message. At 1209, the header of 1209 comprises a user agent field of the HTTP GET request.

At 1212, the first format of 1201 is encoded at a different bitrate, a different container, a different resolution, or combinations thereof, than the second format. At 1213, the first format of 1201 comprises advertising, and the second format is without advertising. At 1214, the response message of 1201 comprises a reference to the one of the first format or the second format based upon whether the request is from the first client device or the second client device. At 1215, the manifest file of 1201 comprises an adaptive bit rate manifest file.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A system, comprising:
    a server complex, comprising:
        an interface portal to receive requests for media content from at least a first client device to receive the media content in a first format and at least a second client device to receive the media content in a second format; and
        one or more hardware processors, operable with a non-transitory memory and the interface portal, the one or more processors to:
            expose, at the interface portal, a generic resource locator pointing to the media content in a generic format;
            receive a request for the media content at the generic resource locator;
            determine, from a header of the request, whether the request is from the first client device or the second client device;
            generate a response message comprising a manifest file comprising a device specific resource locator pointing to the media content cached in one of the first format or the second format based upon whether the request is from the first client device or the second client device, the first format encoded at a different bitrate, a different container, a different resolution, or combinations thereof, than the second format; and
            transmit the response message in response to receiving the request for the media content, the response message comprising a reference to the one of the first format or the second format based upon whether the request is from the first client device or the second client device.

2. The system of claim 1, the one or more processors further to expose, at the interface portal, the device specific resource locator.

3. The system of claim 2, the response message configured in the one of the first format or the second format based upon whether the request is from the first client device or the second client device.

4. The system of claim 2, the server complex comprising at least a first server and a second server, the one or more processors to expose the generic resource locator at the first server and to expose the device specific resource locator at the second server.

5. The system of claim 4, the first server disposed farther from the first client device or the second client device than the second server.

6. The system of claim 4, the one or more processors further to select the second server based upon whether the request is from the first client device or the second client device.

7. The system of claim 2, the one or more processors further to:
    receive a second request for the media content at the device specific resource locator; and
    deliver the media content in the one of the first format or the second format based upon whether the device specific resource locator points to the media content in the first format or the second format.

8. The system of claim 7, wherein:
    the request at the generic resource locator is from the second client device; and
    the device specific resource locator pointing to the media content cached in the second format.

9. The system of claim 1, the request comprising a hypertext transfer protocol (HTTP) GET request.

10. The system of claim 9, the response message comprising a HTTP redirect message.

11. The system of claim 9, the header comprising a user agent field of the HTTP GET request.

12. The system of claim 1, the first format comprising a different video format from the second format.

13. The system of claim 1, the first format comprising advertising, the second format without advertising.

14. The system of claim 1, the response message comprising a manifest file.

15. The system of claim 1, the manifest file comprising an adaptive bit rate manifest file.

16. A method, comprising:
    receiving, at an interface portal of a server complex, a request for media content at a generic resource locator, the request from one of a first client device to receive the media content in a first format or a second client device to receive the media content in a second format;
    determining from a header of the request, with one or more processors of the server complex, whether the request is from the first client device or the second client device;
    generating, with the one or more processors, a response message comprising a manifest file defining a device specific resource locator pointing to the media content cached in one of the first format or the second format based upon whether the request is from the first client device or the second client device, the first format encoded at a different bitrate, a different container, a different resolution, or combinations thereof, than the second format; and
    transmitting, with a communication device of the server complex, the response message in response to receiving the request for the media content to the one of the first client device or the second client device, the response message comprising a reference to the one of the first format or the second format based upon whether the request is from the first client device or the second client device.

17. The method of claim 16, further comprising:
    receiving a second request for the media content at the device specific resource locator; and delivering the media content in the one of the first format or the second format in response to the receiving the second request.

18. The method of claim 17, the receiving the request occurring at a first server of the server complex, the receiving the second request occurring at a second server of the server complex.

19. The method of claim 18, further comprising selecting the second server as a function of whether the request is from the first client device or the second client device.

20. The method of claim 16, the request comprising a HTTP GET request.

* * * * *